United States Patent [19]

Edvardsson

[11] 4,044,355
[45] Aug. 23, 1977

[54] MEASUREMENT OF CONTENTS OF TANKS ETC. WITH MICROWAVE RADIATIONS

[75] Inventor: Kurt Olov Edvardsson, Linkoping, Sweden

[73] Assignee: Saab-Scania Aktiebolag, Linkoping, Sweden

[21] Appl. No.: 658,075

[22] Filed: Feb. 13, 1976

Related U.S. Application Data

[63] Continuation-in-part of Ser. No. 524,143, Nov. 15, 1974, abandoned.

[30] Foreign Application Priority Data

Nov. 20, 1973 Sweden .............................. 7315649

[51] Int. Cl.² .............................................. G01S 9/24
[52] U.S. Cl. .................................... 343/14; 343/17.7
[58] Field of Search ................... 343/12 R, 14, 17, 7

[56] References Cited

U.S. PATENT DOCUMENTS

| | | | |
|---|---|---|---|
| 3,167,767 | 1/1965 | Capelli | 343/14 |
| 3,427,615 | 2/1969 | Hubka | 343/17.7 X |
| 3,727,897 | 4/1973 | Bennett | 343/12 R X |

Primary Examiner—T.H. Tubbesing
Attorney, Agent, or Firm—Ira Milton Jones & Associates

[57] ABSTRACT

A microwave signal that varies linearly in frequency through a sweep period is radiated to and reflected back from a target body. In one mixer the directly generated signal is mixed with the reflected signal to produce a difference frequency corresponding to distance; another mixer mixes the directly generated signal with the same signal delayed for a constant time, to produce a reference difference frequency. Each difference frequency is digitized as a pulse train. The sweep period is divided into successive short time intervals, each of which can begin with a pulse of the lower frequency train and to each of which is assigned a numerical weighting factor, said factors for successive intervals differing stepwise in value. Pulses of each train occurring during each such interval are multiplied by the factor for the interval. All such multiplied pulses are counted through the sweep period to obtain a pair of pulse totals, and a quotient relationship between those totals gives an accurate measure of distance.

8 Claims, 7 Drawing Figures

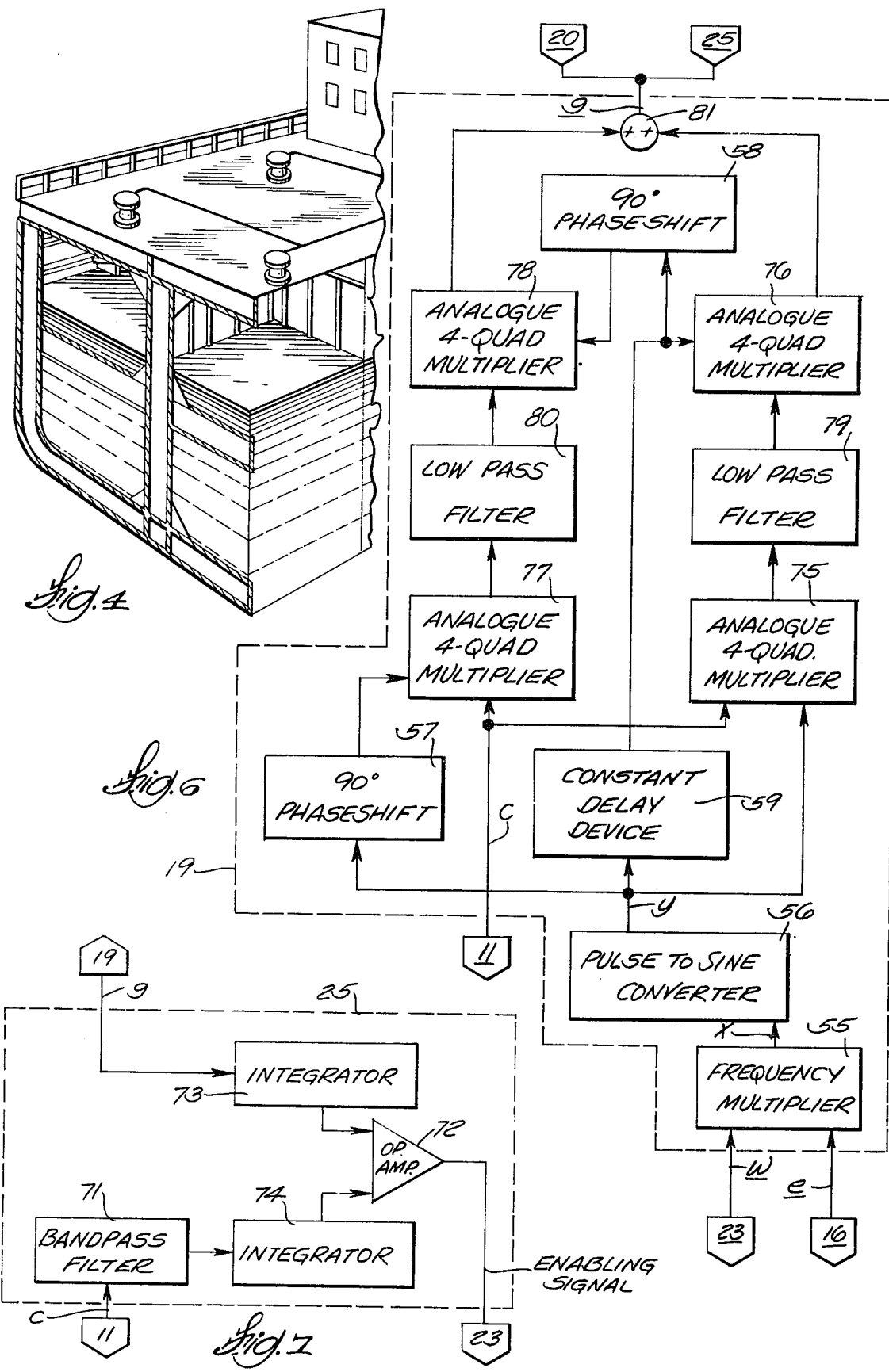

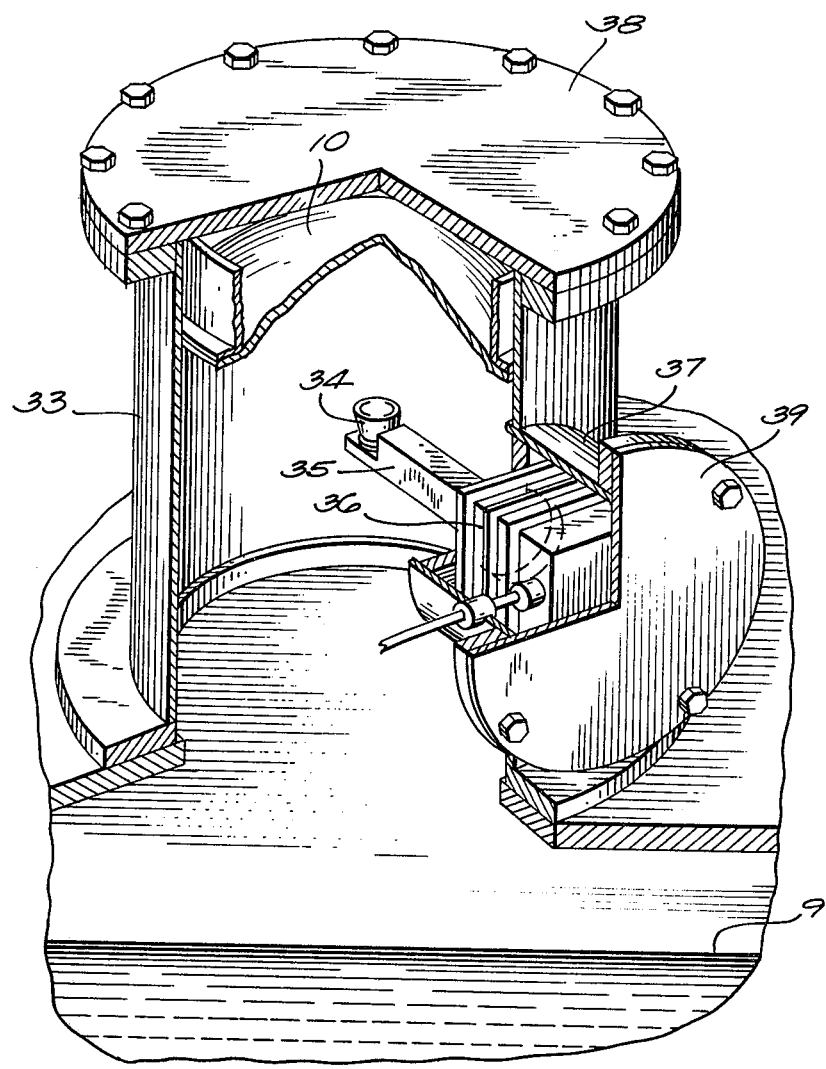

MEASUREMENT OF CONTENTS OF TANKS ETC. WITH MICROWAVE RADIATIONS

This application is a continuation-in-part of Ser. No. 524,143, filed Nov. 15, 1974, abandoned after the filing hereof.

This invention relates to a method and apparatus for taking measurements of distance between a microwave sensor location and a surface; hence in one application thereof the invention relates to the use of microwave radiation for obtaining measurements of the depth or level of a liquid or a solid particulate material in a tank or a cargo vessel hold.

In apparatus of the type with which the invention is concerned, a microwave signal produced by a signal generator is radiated towards a surface, and return radiation reflected from that surface is mixed with the signal coming directly from the signal generator, to produce a difference signal. After appropriate processing of the difference signal it is fed to calculating means from which an output is obtained that corresponds to the time required for the out-and-back journey of the radiation. Owing to the very constant rate of propagation of microwave radiation, that elapsed time bears an accurate and linear relationship to the distance to be measured, and therefore the output of the calculating means can be presented in terms of distance units.

As a specific example of the utility of the present invention and the particular problems that it solves, apparatus embodying the invention can be used to measure the level of a liquid (such as oil) or of a paticulate solid material (such as grain) in the hold or storage tanks of a cargo vessel. The use of microwave apparatus is advantageous in such applications, not only because there is no need for physical contact between the measuring apparatus and the material being measured but also because microwave apparatus is relatively insensitive to dust and the like and is therefore satisfactory for measuring the level of such dusty materials as grain and cement.

Prior microwave distance measuring devices are disclosed in British Pats. No. 1,100,119 of 1968 and No. 1,207,565 of 1970 and in U.S. Pat. No. 3,229,286 to J. Samuel et al. Of these, only British Pat. No. 1,100,119 is concerned with microwave apparatus intended for measuring the level of material in a vessel or a container; the other two references relate to measurement of distances in open space, as in the case of a radar altimeter for aircraft.

While the general principles of microwave distance measurement are the same for both types of applications, measurement of the level of material in a tank or the hold of a cargo vessel presents special problems not encountered with such devices as radar altimeters. In all microwave distance measurements there is a need for accurate determination of small frequency differences between the radiated microwave signal and the received reflected signal. But when distances are measured in the interior of a vessel or container, the required accuracy may be compromised by disturbances in the received return signal, due to echoes from structural members such as support beams, echoes from the bottom of the tank or vessel itself, and returns from waves when the reflecting surface is that of a liquid.

A further source of possible inaccuracies is inherent in the apparatus itself. The radiated microwave signal is emitted in successive sweeps, during each of which the frequency of that signal is caused to vary all through the sweep. Nominally such variation in signal frequency is linear with time through the sweep. However, there is no certainty that each sweep is truly linear; on the contrary, perfect linearity is attainable only with complicated and costly apparatus, and therefore it is safer to assume that there is some departure from true linearity in every sweep.

Thus, some of the irregularities in the signal to be processed may be due to the apparatus itself and some to external factors. Because the source of any particular irregularity usually cannot be known, correction of such disturbances, or compensation for them, presents a complicated problem.

British Pat. No. 1,207,565 discloses an expedient which might afford some compensation for nonlinearity of the microwave sweep. In the radio altimeter of that patent, a pair of mixers are provided, both of which are directly connected with the microwave signal generator to receive signals from it as they are generated. One of these mixers, as usual, also receives reflected radiated signals, and it produces an output having a difference frequency which corresponds exactly (assuming no disturbance frequencies in the return signals) to the out-and-back distance travelled by the return signals. The second mixer, in addition to its direct connection with the signal generator, has a connection with a delay line from which it receives a signal that corresponds to the generated signal delayed by a fixed time interval. In response to these two inputs to it, the second mixer produces an output having a frequency which corresponds to an arbitrary fixed distance. The frequencies of the outputs of the two mixers are compared, to derive a distance measurement output in terms of the arbitrary fixed distance signified by the delay line. Since the two difference frequencies being compared are both functions of the same generated sweep, non-linearities in the sweep are compensated for to some extent; but because those two frequencies are not identical functions of the generated sweep, any non-linearity in the sweep will still bring about inaccuracies in the measurement results.

And, of course, the apparatus just described cannot correct or compensate for irregularities that are due to external influences such as structural members that produce disturbances in the reflected return signal. For this reason, the teachings that relate to radar altimeters and the like afford no solution to the problems peculiar to distance measurements inside tanks and vessels. On the other hand, British Pat. No. 1,100,119, which relates to apparatus for making distance measurements in an enclosure, evidences no recognition of any of the above mentioned problems and of course offers no solution to them.

Accordingly, it is the general object of this invention to provide a method and apparatus for distance measurement by means of microwave radiation signals emitted towards a surface and return signals reflected back from the surface, which method and apparatus affords accurate and consistent measurements notwithstanding disturbances of the return signals that are due to conditions external to the microwave apparatus and notwithstanding nonlinearities in the microwave signal sweep and distortions of the return signal that may be due to conditions within the measuring apparatus itself.

Another and more specific object of this invention is to provide a method and apparatus for microwave distance measurement that has a fail-safe feature whereby it automatically rejects measurement results that are likely to be inaccurate by rejecting return signals from a surface when such return signals are of such low amplitude or are otherwise so degraded that they are likely to yield incorrect measurement results.

A further specific object of this invention is to provide measurement apparatus of the character described that is suitable for cooperation with a minicomputer or a microcomputer and which lends itself especially well to an installation comprising a number of tanks or containers, wherein the signal processing apparatus cooperates on a time-shared basis with a sensor at each tank or container to quickly obtain and present accurate information about the level of the contents at each sensor location.

It is also a specific object of this invention to provide a method and apparatus for distance measurement with a microwave signal that has a more or less linear frequency sweep, wherein data obtained through a major portion of each sweep are processed by statistical methods which minimize the effects of sweep non-linearity and of short-term signal disturbances that may occur in any portion of the sweep, and whereby greatest weight is accorded to such portions of the data as correspond to the middle portion of the sweep so as to minimize the effects of erroneous data near the ends of the sweep that would otherwise have a strong influence on measurement results.

With these observations and objectives in mind, the manner in which the invention achieves its purpose will be appreciated from the following description and the accompanying drawings, which exemplify the invention, it being understood that changes may be made in the precise method of practicing the invention and in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 4 is a cut-away perspective view of an oil tanker vessel having liquid level measuring apparatus embodying the principles of this invention installed at a plurality of locations thereon;

FIG. 5 is a perspective view, partly in section, illustrating in detail one of the liquid level measuring installations shown in FIG. 4;

FIG. 6 is a block diagram of one form of variable center frequency bandpass filter that can be employed in the apparatus of this invention; and FIG. 7 is a block diagram of the amplitude comparator.

Figure 1:
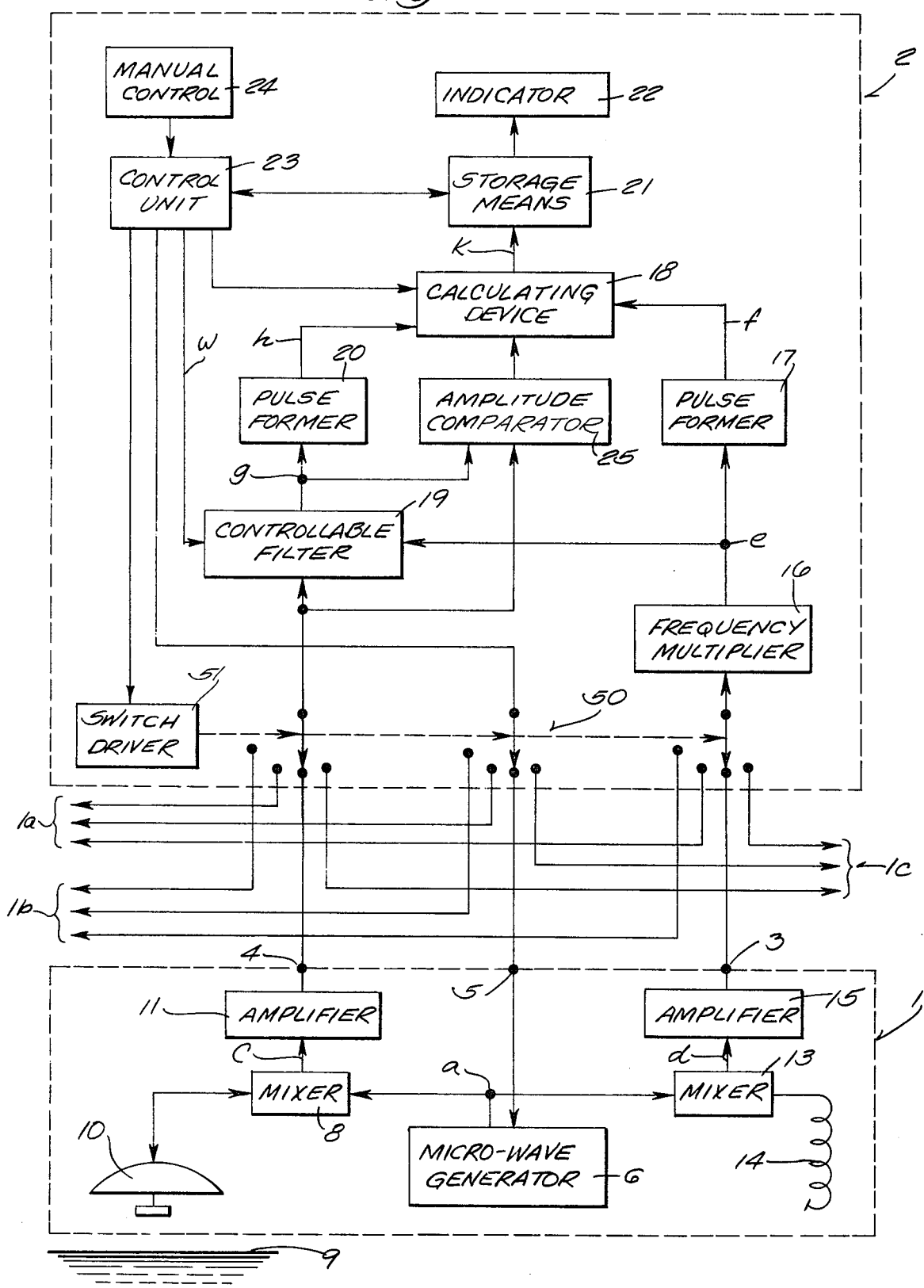
FIG. 1 is a block diagram of microwave distance measuring apparatus embodying the principles of this invention.

Referring now to the accompanying drawings, the method of this invention will be apparent from a consideration of one form of apparatus for the practice of that method, illustrated diagrammatically in FIG. 1, wherein the reference numeral 1 designates generally a sensor device which comprises a microwave generator 6, a pair of mixers 8 and 13, and a pair of amplifiers 11 and 15.

The sensor device is illustrated in structural form in FIG. 5, and several sensor devices 1 are shown in FIG. 4 in a typical installation for measuring oil or the like in the several tanks of a tanker vessel. As shown in FIG. 5, each sensor can comprise an upright tubular capsule 33, in the upper portion of which is mounted a bowl-shaped downwardly concave antenna 10. A smaller tubular capsule 37, mounted on one side of the capsule 33 with its axis horizontal, houses the microwave generator and mixers, which are together designated by 36 in FIG. 5. A wave guide 35 projects into the larger capsule from the units 36 and carries at its inner end a microwave horn 34 which is spaced below the antenna 10 and coaxial therewith. A cover 38 is removably mounted on the top of the larger tubular capsule 33, over the antenna 10, and another removable cover 39 is mounted on the outer end of the smaller tubular capsule 37. The covers thus cooperate with the tubular capsules to fully enclose the antenna, the horn 34, the wave guide 35 and the function block 36, but because the covers are removable, those components are accessible for inspection and repair.

Referring back to FIG. 1, three terminals 3, 4, 5 on the sensor 1 provide for its connection with a signal processing unit 2 that also cooperates with a number of other sensors (not shown in FIG. 1). Connections to such other sensors are indicated at 1a, 1b and 1c, and it will be understood that there may be a substantially large number of them, all identical with the one illustrated. By means of known switching apparatus, designated generally by 50 and illustrated as comprising a switch driver 51, the several sensors are individually connected with the signal processing apparatus in sequence, so that it cooperates with them on a time sharing basis. The sequence of such connections can be controlled by means of a control unit 23 which can comprise a properly programmed mini- or micro-computer and which is a part of the signal processing unit having a suitable connection to the switch driver. For simplicity, only the important input and output connections to the control unit 23 have been indicated in FIG. 1. From the following description, as it proceeds, those skilled in the art will readily understand the nature of the connections that have not been shown.

The microwave generator 6 of the sensor can comprise a varactor-tuned Gunn diode. Through the connection terminal 5, the microwave generator is supplied with sweep start pulses from the control unit 23. Each such sweep start pulse initiates a sweep, that is, a period of variation of the frequency of the generated microwave signal during which the frequency of that signal is caused to vary substantially linearly with time, as illustrated by line a in FIG. 3.

The output of the microwave generator is fed to both of the mixers 8 and 13. The mixer 8 has a controlled leakage whereby a portion of its microwave signal input is fed to the antenna or radiator 10, which is directed towards the surface 9 on which height or depth measurement is to be made. That surface is herein designated the target surface, and in this case it can be considered, for purposes of example, as the surface of liquid in a vessel. The radiator 10 faces downwardly and is mounted in a fixed position above the highest level to which liquid in the vessel can be expected to rise. The radiator 10 serves both as a transmitting antenna and as a receiving antenna, although it will be understood that separate transmitting and receiving antennas could be employed.

Figure 3:
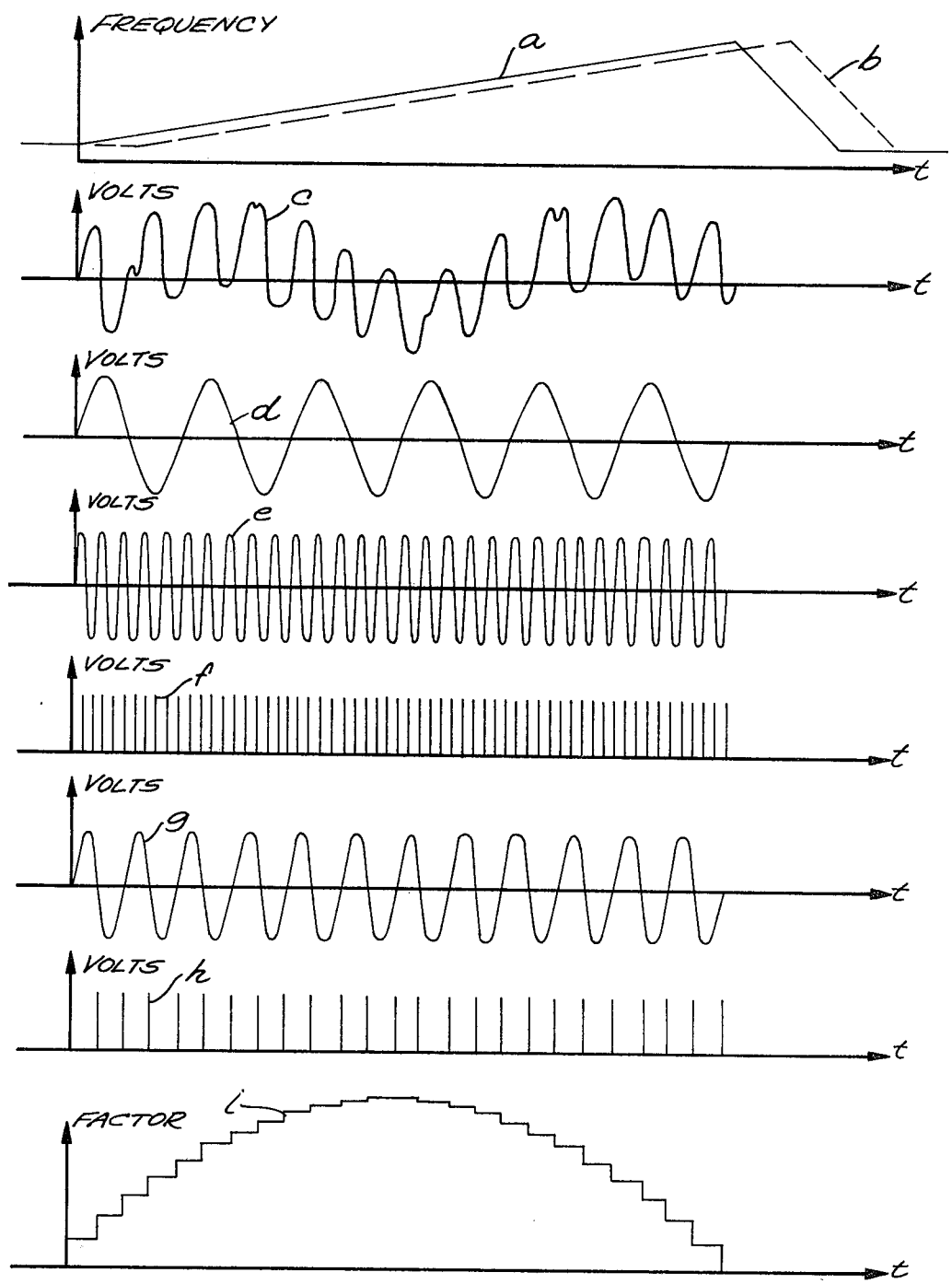
FIG. 3 is a sequence of time-amplitude diagrams illustrating the nature of the various signals produced in the apparatus illustrated in FIG. 1, and showing the several signals in their relative time relationships to one another.

The mixer 8 comprises a receiver connected with the antenna 10. The return microwave signal reflected from the target surface and picked up by the antenna 10 is mixed by the mixer 8 with the microwave signal coming directly from the generator 6. Line $b$ in FIG. 3 illustrates the frequency of the return signal in relation to the frequency of the signal $a$ that is directly fed to the mixer 8. Because of the time required for the out-and-back travel of the return signal $b$, it is delayed relative to the direct signal $a$ and is therefore shown as displaced to the right of the direct signal.

Owing to the substantially linear variation of the microwave signal, the delayed relationship between the direct and return signals results in a frequency difference between them, which difference is represented by the vertical distance between lines $a$ and $b$. The output of mixer 8, which is represented by line $c$ in FIG. 3, is thus a signal having a frequency equal to the difference between the frequencies of signals $a$ and $b$. With increasing delays between signals $a$ and $b$, due to increasing distances to the target surface 9, the difference output of the mixer 8 will increase in frequency, as is apparent from the top line of FIG. 3. The $c$ signal output of the mixer 8 therefore constitutes a distance signal having a frequency component that corresponds to the distance between the mixer 8 and the target surface 9.

The $c$ signal output of the mixer 8 is amplified by the amplifier 11 and is fed to the signal processing unit by way of the terminal 4 of the sensor unit.

If the frequency variation of the microwave signal during the course of one sweep or frequency-change period were truly linear, and if the return signal faithfully corresponded to the radiated signal, the output of the mixer 8 during that sweep would be a pure sinewave signal of constant frequency. In fact, however, several distributing factors may cause the distance signal to have irregularities, as illustrated by line $c$ in FIG. 3. Among the causes of such disturbances, as explained above, are nonlinearities in the microwave generator 6 and structural beams 12 (see FIG. 4) in the interior of the vessel, which give rise to echoes that can be confused with the return signal echoes from the target surface 9. In addition, waves on the target surface, such as occur on the surface of oil cargo in a tanker vessel, can cause disturbances in the return signal, due to the various directions in which they reflect the radiation, the constantly changing distances to the target surface that they present, and some amount of Doppler effect that they tend to introduce into the return signal. The return signal may also contain frequency components due to so-called ghost echoes within the antenna 10.

The second mixer 13 produces a signal which is employed in correcting and compensating for disturbances from all sources, internal and external. In addition to an $a$ signal input that the mixer 13 receives directly from the microwave generator 6, it receives a microwave signal input which has been passed through a delay line 14 and which thus corresponds to the generated $a$ signal delayed by a constant time. Hence the output of the mixer 13 is a difference frequency signal of a substantially constant frequency that corresponds to an arbitrarily chosen fixed distance. That output signal, which can be considered a reference signal, is depicted in line $d$ of FIG. 3. The output of the mixer 13 is amplified by an amplifier 15 and is fed to a frequency multiplier 16 in the signal processing unit 2 by way of the terminal 3 of the sensor unit.

Various forms of frequency multipliers (doublers, triplers and the like) are well known and are commercially available. By reason of the use of the frequency multiplier 16, the delay line 14 can be one that affords a relatively short delay time and is therefore compact and inexpensive and is not characterized by unduly large damping that would cause problems in the performance of operations carried out in the signal processing unit 2. The relatively small distance signified by the reference signal $d$ that issues directly from the mixer 13 is one that might be within the range of distances to be measured, whereas the mutliplication factor of the frequency multiplier 16 is preferably so chosen that the signal which issues from it will have a frequency corresponding to a greater distance than any to be measured, to thus afford a convenient fixed distance reference. Other advantages in signal processing that result from the use of a reference frequency that is relatively high in relation to the difference frequency $c$ will appear as the description proceeds.

The output of the frequency multiplier 16, which is depicted in line $e$ of FIG. 3, is thus a modified reference signal having a constant amplitude and a substantially high frequency which is a fixed multiple of the reference frequency $d$.

Returning now to the amplified oscillatory distance signal $c$ that is produced by the mixer 8 and amplified by the amplifier 11, that signal is fed, by way of terminal 4 of the sensor unit and the switching apparatus 50 of the processing unit, to a controllable filter 19 which comprises a part of the signal processing unit. For reasons mentioned above, the $c$ signal may (and usually does) contain undesired frequency components in addition to the useful frequency component that corresponds to the distance being measured. But the frequency of the useful component of the $c$ signal will vary rather widely, in correspondence with the distance being measured. Therefore, if the $c$ signal were passed through a bandpass filter with a fixed center frequency, the passband of the filter would have to be wide enough to accommodate the full range of useful frequencies, and would consequently pass a substantial portion of the disturbance components. In the apparatus of the present invention the filter 19 is one that has a narrow passband, but, in effect, the center frequency of its passband is controlledly varied to accommodate the prevailing frequency of the useful component of the $c$ signal.

The useful frequency component of the $c$ signal varies not only with the distance being measured but also with nonlinearities and instabilities in the sweep generator. However, the modified reference signal $e$ is subject to most of the system errors that affect the distance signal $c$, and therefore it can be employed in the centering of the filter passband to compensate for these system errors. As used for that purpose, the $e$ signal is modified to a signal $y$ that has a frequency which is related to the distance being measured and which is generated with the use of a signal $w$ from the control unit 23. The frequency of the $y$ signal — which is to say, the extent to which the $e$ signal is modified — is normally determined upon the basis of stored data obtained (as explained hereinafter) from an immediately preceding distance measurement made with the same sensor.

It is possible to use a filter with a relatively narrow passband and with a center frequency that is changed from sweep to sweep but remains constant through each sweep; but the passband of such a filter would have to be broad enough to accommodate frequency variations during the sweep that were due to non-linearity of the sweep, and consequently such a filter might not be accurate for measurements at low liquid levels, owing to inability to effectively reject disturbances due to the bottom of the tank itself. The preferred form of the controllable filter 19 is therefore as described hereinafter, wherein the center frequency of the passband is at all times subject to controlled variation.

As illustrated in FIG. 6, the controllable filter 19 can comprise two circuits 55, 56 for generating the filter control signal *y*, two phase shifters 57, 58, a delay device 59, four analogue four-quadrant multipliers 75–78, and two low-pass filters 79, 80.

The circuit 55 is basically a frequency multiplier which receives as inputs the modified reference signal *e* from the frequency multiplier 16 and the *w* signal from the control unit 23. The *w* signal is issued in a form corresponding to a binary number which is constant during each frequency sweep of the generator 6 and is proportional to the preceding distance measurement made with the same sensor. (How a value is assigned to the *w* signal when there has been no such preceding distance measurement is explained below). It will be understood that the oscillatory *e* signal is converted to a pulse signal either within the frequency multiplifer circuit 55 or before being fed into it. The output *x* of the frequency multiplier 55 is a pulse train with a frequency which is at every instant in a predetermined ratio to the frequency of the modified reference signal *e*, the constant of proportionality being defined by the prevailing value signified by the *w* signal and thus remaining constant for the duration of a sweep. The circuit 55 can comprise a synchronous binary rate multiplier (the Texas Instruments SN 7497 being one example of such a device) which multiplies the frequency of an incoming pulse train by a selectable constant less than one, the constant in this case being the number denoted by the *w* signal from the control unit 23. So that the *x* signal output of the circuit 55 will have a correct scale factor, the incoming *e* signal, before being multiplied by the *w* signal, is multiplied by a constant number larger than one. For the purpose of such preliminary multiplication of the *e* signal, the circuit 55 can further comprise a binary counter arrangement connected in a manner that will be understood by those skilled in the art.

The *x* signal issues from the circuit 55 to the circuit 56, which is essentially a pulse-to-sine wave converter by which the pulse train signal *x* is converted into a sinusoidal signal *y*. Apparatus for performing such conversion functions is known, and therefore details of the circuit 56 are not illustrated. It can comprise a cyclic counter, a sine table in the form of a small memory with a binary output, and a digital-to-analogue converter. The frequency of the oscillatory *y* signal that issues from the converter circuit 56 is in a constant ratio to that of the pulsing *x* signal from which it is in effect derived and is preferably lower than that of the *x* signal. The *y* signal is useful as a filter control signal because its frequency is close to the frequency of the useful distance measurement component of the *c* signal.

The *c* signal is fed simultaneously to each of the two analogue four-quadrant multipliers 75, 77. The *y* signal is fed directly to the analogue multiplier 75 and is fed to the analogue multiplier 77 through a 90° phase shift device 57. Thus in the multiplier 75 the *c* signal is multiplied by the *y* signal itself, while in the multiplier 77 the *c* signal is multiplied by the *y* signal with a 90° phase shift. The outputs of the analogue multipliers 75, 77 will respectively contain the sum of the difference of the filter control frequency *y* and of each of the frequency components in the input signal *c*. If the useful distance frequency component of the *c* signal happens to be the same as it was during the immediately preceding measurement with the same sensor, and assuming that the *c* signal contains no disturbances, the output of each analogue multiplier 75, 77 will be a d.c. signal. In practice, instead of being a d.c., these outputs have a very low frequency, due to actual changes in the measurement distance since the preceding measurement. Such components of the *c* signal as differ substantially in frequency from the filter control frequency *y*, and which correspond to signal disturbances, will cause the outputs of the multipliers 75, 77 to differ substantially and correspondingly from d.c.

The outputs of the analogue multipliers 75 and 77 are respectively filtered through low pass filters 79 and 80. From what has just been said, it will be apparent that each of those filters will pass only so much of its respective input as corresponds to components of the *c* signal that are close in frequency to the frequency of the filter control signal *y*, rejecting all frequency components of the *c* signal that differ substantially from the frequency of the *y* signal.

The filtered signal issuing from the low pass filter 79 is fed to a third analogue four-quadrant multiplier 76, where it is multiplied by a delayed copy of the *y* signal, that is, by the output of the constant delay device 59 into which the *y* signal has been fed. The filtered signal issuing from the low pass filter 80 is multiplied by the delayed *y* signal after the same has been passed through a 90° phase-shift device 58. The delay provided by the delay device 59 is necessary to compensate for the delay in the low-pass filters 79 and 80. The delay device can comprise, for example, an analogue-to-digital converter, shift registers, and a digital-to-analogue converter.

The outputs of the multipliers 76 and 78 are added to one another at a summation point 81, to which both are fed. Due to well-known properties of the trigonometric functions, the resultant sum signal *g* will contain only the difference frequency between the delayed filter control frequency *y* and the filtered signals issuing from the low pass filters 79 and 80.

Considering the function of the controllable filter 19 as a whole, its operation can be summarized as a constant bandwidth filtering of the signal *c* around a center frequency that is proportional to both the number signified by the *w* signal and the momentarily prevailing frequency of the modified reference signal *e*.

Analogue four-quadrant multipliers are commercially available devices, the RCA CA 3091D being an example. Although the controllable filter 19 is herein illustrated and described as comprising mainly an analogue system, it will be understood that its function could be performed by digital means, or by some other combination of analogue and digital means, using commercially available components in any case; and conceivably its function, as summarized above, could be accomplished by means of softwear in suitable data processing apparatus.

The filtered oscillatory signal issuing out of the filter 19, which is represented by line *g* in FIG. 3, is fed to a pulse former 20 that produces pulses at a rate bearing a fixed relationship to the frequency of the g signal. In this case the pulse former 20 is caused to emit one pulse for each half-cycle of the g signal, issued at each zero crossing thereof. Line h in FIG. 3 illustrates the pulse train emitted from the pulse former 20.

In like manner, the oscillatory modified reference signal e that issues from the frequency multiplier 16 is fed to a pulse former 17 that issues a pulse at each zero-crossing of the e signal. Line f in FIG. 3 illustrates the pulse train emitted by the pulse former 17. It will be apparent that the f pulses could be supplied to the frequency multiplier 55 of the controllable filter 19 to provide the e signal frequency fed thereto.

Each of the pulse formers 20 and 17 can be a commercially available device, the Schmitt trigger being a common pulse forming device suitable for the purpose.

Figure 2:
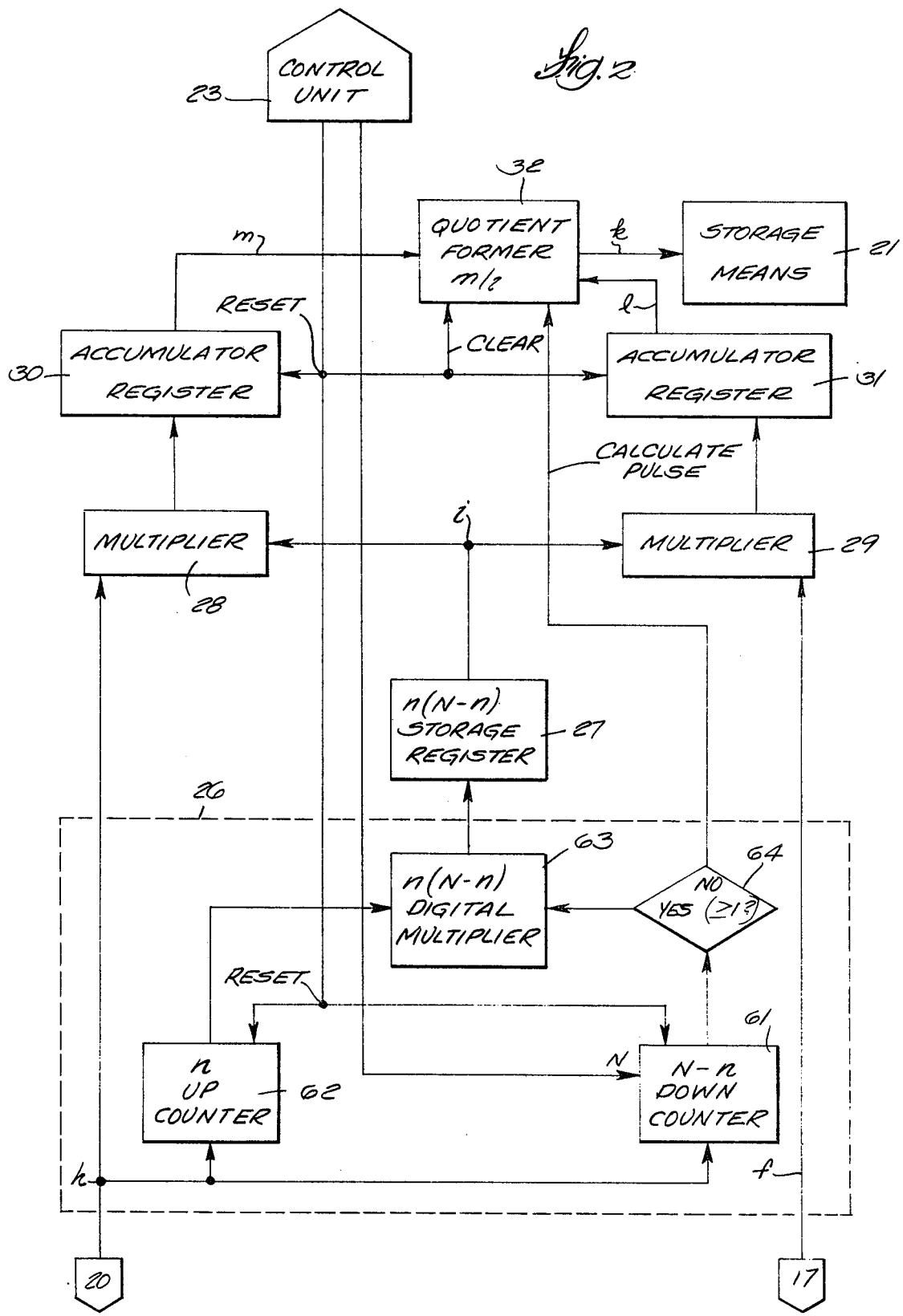
FIG. 2 is a block diagram of the calculating device that comprises a part of the apparatus illustrated in FIG. 1, in its relation to certain other parts of the signal processing unit.

The h signal pulses and the f signal pulses are both fed to a calculating device 18 which is illustrated in more detail in FIG. 2. Before describing that apparatus, however, it would be well to explain certain theoretical considerations underlying the calculation which it performs.

As has already been indicated, lines a and b in FIG. 3 present an idealized picture of the sweep signal and the return signal. In practice a perfectly linear variation of frequency with time is virtually unattainable, and the actual a signal would be represented by a more or less curved line rather than a straight one. The return signal b would be represented by a correspondingly curved line. The distance between those curved lines would similarly vary with time through the sweep, which is to say that the frequency of the distance signal c would vary through the sweep time, the direction of its variation (increasing or decreasing frequency) being dependent upon the direction in which the a signal departs from linearity (concave or convex curvature).

In the simplest ideal case, with a perfectly linear a signal and a perfectly returned b signal, the ratio of f pulses to h pulses in any part of the sweep would be equal to the ratio of the reference distance (signified by the modified reference frequency e) to the distance to be measured (signified by the difference frequency c). Since there is no way to interpolate between pulses, increased resolution would be obtained by taking the quotient relationship between f and h pulses through a substantially major part of the sweep rather than through only a small part of it.

Disturbances in the distance signal c cannot be completely eliminated by filtration, and such disturbances remaining in the g signal, in combination with non-linearity in the sweep, would give rise to unduly large measuring errors if a direct counting and quotient procedure were used. Such errors would arise in two ways. First and more important, only the time of occurrence of the first and last pulse would be used in the evaluations; but any disturbances in the g signal cause the times of occurrence of its zero crossings to have individual and very large errors, which errors would be carried into the result without reduction. Secondly, the unweighted pulse counting would give two sampled mean values of the unlinear sweep, and these two means values would have errors due to the fact that different points of the unlinear sweep were used for independent forming of the two mean values. It must be borne in mind that the distance signal c represents a mixing of a return signal initially produced at one time in the sweep with a directly generated signal produced at a later time in the sweep, while the e signal involves a delayed signal that was initially generated at still another time during the sweep. With the method of the present invention, the time of occurrence of every zero crossing of the g signal is caused to have the same influence on the result, so that available information is used in an optimal way and the effects of sweep non-linearity are substantially overcome by using the modified reference signal e as an artificial time scale.

With this in mind, the method of the present invention utilizes signals obtained all during a substantially major portion of the sweep but employs a center-weighted averaging procedure whereby, in effect, more importance is attributed to signals produced near the center of the sweep than to those produced near its ends.

Various methods are known for weighting data having small statistical irregularities. In general, where the average value of a number of somewhat scattered data points is believed to fall closest to a true value, the value of each data point can be multiplied by a weighting factor equal to:

$$[(\text{average})^2 - (\text{departure from average})^2]$$

to obtain a usefully weighted average. In the present case, it is assumed that the average value is close to the center of the sweep period, and the portion of the sweep period during which data are taken is divided into N arbitrary time intervals, each designated by the original number n. the weighting factor just mentioned can therefore be restated as:

$$\left[\left(\frac{N}{2}\right)^2 - \left(\frac{N}{2} - n\right)^2\right],$$

which reduces to:

$$n(N-n).$$

It is true that weighting the average pulse counts in this manner cannot totally eliminate errors resulting from variations in the start of the count, nor eliminate influences from weak disturbing echoes not suppressed by the controllable filter 19. However, weighting the data in this manner does reduce the errors and probable errors to a substantially low magnitude and is a statistically valid method for materially reducing errors due to non-linearity of the sweep and to disturbance echoes.

As a matter of practical convenience, each of the N time intervals into which the sweep is divided can begin upon the issuance of an h pulse. This makes it possible to employ a count of the h pulses for the value n, weight the count of each set of pulses by the factor $n(N-n)$, and stop the count when the number of h pulses reaches N.

The fact that the time between h pulses will vary slightly introduces an element of error, but this error can be shown to be minimal so long as the same time intervals are used for determining both the count and the weighting of the higher frequency f signal. The error in counting f pulses during any interval between two consecutive h pulses is a function of the frequency ratio between f and h, and can be relatively large if there is not an inconveniently large difference in frequency between f and h. However, this error is predominantly a cyclical one and tends to be balanced out by any averaging method. Hence the center-weighted mean square method employed in the practice of the present invention reduces this cyclical error while also minimizing errors due to non-linearity of the sweep and to signal disturbances.

Turning now to the apparatus by which this data processing method can be implemented, as illustrated in FIG. 2, it comprises, in general, apparatus 26 for calculating the weighting factor $n(N-n)$, a storage register 27, a pair of multipliers 28 and 29, a pair of accumulator registers 30 and 31, and a quotient former 32. The weighting factor calculator 26, in turn, comprises a down-counter 61, an up-counter 62, a digital multiplier 63 and a steering gate 64.

At the start of each sweep the control unit 23 issues an impulse that clears the registers 27, 30 and 31 and the quotient former 32 an causes the up-counter 62 to be reset to zero. It is assumed that a predetermined value of N is stored in the control unit 23; and that value is charged into the down-counter or negative adder 61 at the beginning of the sweep. During the sweep, each $h$ pulse issuing from the pulse former 20 is fed to the down-counter 61 and also to the up-counter or positive adder 62. Hence at any given time during the sweep, the contents of the up-counter 62 will equal $n$ (the number of $h$ pulses issued during the sweep to the time in question) and the contents of the down-counter 61 will equal $N-n$. The counts stored in the counters 61 and 62 are fed at each $h$ pulse, without reset of those counters, to the digital multiplier 63, by which they are multiplied, one by the other, to obtain the value $n(N-n)$. That value is fed into the storage register 27, which thus always holds the prevailing value of th weighting factor $n(N-n)$.

The multipliers 28 and 29 are in effect gates, since each serves to multiply by one the contents of the storage register 27. The multiplier 28, which receives $h$ inputs from the pulse former 20, in effect feeds to the accumulator register 30, at the issuance of each $h$ pulse, an input corresponding to the then-current $n(N-n)$ content of the storage register 27. In like manner, the multiplier 29 receives $f$ pulses from the pulse former 17 and, for each $f$ pulse causes an input to be issued to the accumulator register 31 that corresponds to the $n(N-n)$ content of the storage register 27. The contents $m$ of accumulator register 30 at the end of a sweep thus correspond to a summation of $n(N-n)$ through the sweep; while the contents $l$ of accumulator register 31 at the end of a sweep correspond to a summation of $n(N-n)$ times the number of $f$ pulses issued for each $h$ pulse. At the end of the sweep, the quotient former 32, which is connected with the accumulator registers 30 and 31, is caused to calculate the quotient $m/l$, to obtain a weighted average value corresponding to the ratio of the measured distance (signified by the difference signal $c$) to the reference distance (signified by the modified reference signal $e$).

The steering gate 64 in effect determines when the number of $h$ pulses during a sweep has reached the predetermined N value charged into the down-counter 61. So long as the count held by that counter is equal to one or more, the steering gate causes the contents of the down-counter to be fed to the multiplier 63 at each $h$ pulse. When the down-counter has been counted down to zero, the steering gate causes the next succeeding $h$ pulse to be fed to the quotient former 32 as a calculate pulse. The quotient former can comprise a shift register arranged for multiple subtraction.

It will be apparent that the number of $h$ signal pulses that will be produced during a frequency sweep will vary rather widely, depending upon the distance to be measured. Consequently, if the distance to the target surface is relatively large, so that the $h$ pulse frequency is high, an arbitrarily selected value of N may result in processing of pulses during only a small part of the sweep cycle; whereas if the target surface is at a very high level, the time required for the same number of $h$ pulses may be longer than the time required for a complete sweep. In some cases, therefore, it may be useful to count $f$ and $h$ pulses through a predetermined major portion of the time occupied by each sweep cycle, and then establish a value for N at the conclusion of the count, doing all weighting in a final calculation. The mechanization of this procedure will be apparent to those skilled in the art from the fact that the desired weighted average of $h$ is defined as:

$$\Sigma_0^N [n(N - n)]$$
$$= \Sigma_0^N [nN - n^2]$$
$$= N \Sigma_0^N n - \Sigma_0^N n^2$$
$$= \frac{N(N + 1)}{2} - \frac{N(N + 1)(2N + 1)}{6}$$

The preferred procedure for obtaining a center-weighted average of the distance data signified by the $f$ and $h$ pulse signals can now be summarized as follows. A time period covering a substantially major portion of the sweep is divided into N short and substantially equal successive time intervals, each of which preferably begins upon the issuance of an $h$ pulse. The value of N may either be predetermined and uniform for all sweeps or may vary from sweep to sweep and correspond to the number of $h$ pulses conunted during a predetermined time period during the sweep that covers a major portion of the duration of the sweep across the middle thereof. To each of the N time intervals there is assigned a numerical weighting factor which is different from that assigned to its immediately preceding and immediately succeeding time intervals and depends upon the position of the particular time interval in the time interval sequence, being largest for the time interval at the middle of the sequence. The preferred weighting factor is calculated on the basis of $n(N-n)$, where n is the ordinal number of the particular time interval, i.e., $n = 1$ for the first time interval, $n = 2$ for the second time interval, etc. Line $i$ in FIG. 3 illustrates graphically the numerical factors assigned to the successive time intervals for one sweep on the particular basis that is preferred. Each of the $h$ and $f$ pulses issued during the sweep is in effect multiplied by the weighting factor assigned to the small time interval during which that pulse is produced. All products of such multiplication, for each pulse set, are totalled; and the two totals then represent a centerweighted average value of each of the respective $h$ and $f$ signals during the course of one sweep, obtained by the method of least squares.

The quotient $k$ that is formed by the quotient former 32 represents the quotient between the two center-weighted averages just mentioned, that average for the $h$ pulses being represented by the total number of pulses $m$ stored in the accumulator register 30 during the sweep and that average for the $f$ signals being represented by the total number of pulses 1 stored in the accumulator register 31 during the same sweep. Except for a scale factor, the quotient $k$ corresponds to the distance being measured.

The quotient output $k$ from the quotient former 32 is fed to storage means 21, in which it is preserved to be used as a basis for establishing the value signified by the $w$ signal during the next sweep made by the particular sensor from which the stored data were obtained. A suitable indicator or readout device 22 is of course connected with the storage means 21 to provide a display of the distance value signified by the stored data. Although not so shown, it will be understood that the storage means can be connected with the indicator 22 through the control unit 23, so that the readout can be displayed in numerals, and that the storage means can itself comprise a part of the control unit.

Under certain circumstances — as when the target surface is extremely wavy — the return signal $b$ may be so distorted or attenuated that the difference signal $c$ becomes unreliable; and when this happens it is desirable that there be no display. The amplitude comparator 25, which comprises a part of the signal processing unit 2, serves to prevent issuance of a read-out when a reliable measurement is not available. FIG. 7 illustrates in more detail one type of amplitude comparator that can be employed in the apparatus of this invention.

In any microwave system there is a likelihood that a ghost echo will appear as a function of the equipment itself, or as a result of a reflection from some fixed surface (a beam or the like) from which an echo is returned. Whether internally or externally caused, the ghost echo will usually have a frequency corresponding to a relatively fixed distance and an amplitude substantially lower than that of the useful return signal. In the illustrative amplitude comparator apparatus depicted in FIG. 7, such a ghost echo is assumed to be available; and if one is not inherent in the sensor apparatus, it can be readily produced with a fixed reflector. The amplified $c$ signal issuing from the sensor 1 therefore contains, in addition to its useful distance frequency component plus spurious frequency components due to disturbances, a low amplitude ghost component of substantially fixed frequency. In addition to being passed to the controllable filter 19 and processed as described above, the unfiltered $c$ signal is fed to a fixed band bandpass filter 71 tuned to the known frequency of the ghost component, and which therefor passes only the ghost component frequency. Since only the amplitude of the ghost component is of interest, and its frequency is substantially fixed, a simple filter can be used. In effect, the amplitude of that filtered ghost signal is compared with the amplitude of the $g$ signal issuing from the controllable filter 19, by means of an operational amplifier 72. Since both of the signals to be applied to the operational amplifier are a.c. signals, but their instantaneous differences are not of interest, each of them must be integrated before being fed into the operational amplifier, to eliminate the effects of phase and frequency differences between them. Thus the $g$ signal from the controllable filter 19 is fed to an integrator 73 and the filtered ghost signal is fed to an integrator 74. Each of said integrators can be a conventional unit comprising a rectifier and a small capacitor.

The operational amplifier 72, which can be a commercially available device, receives inputs from the two integrators 73, 74 and is so connected as to produce an enabling signal only when the ratio of the outputs from the integrators 73, 74 exceeds a predetermined value. That enabling signal, which constitutes the output of the comparator 25, is in effect employed to control whether or not the calculating device 18 will accept $f$ and $h$ signals, as schematically indicated in FIG. 1. In actual practice, the enabling signal from the amplitude comparator is issued to the control unit 23, as illustrated in FIG. 7, and the control unit, in turn, issues an enabling output to the calculating device 18 in response to it, so that the calculating device can process the $f$ and $h$ signals as described above. In the absence of the enabling signal, the $f$ and $h$ signals are of course discarded that is, they are prevented from entering the calculating device 18.

The amplitude comparator just described is particularly useful in situations where the amplitude of the microwave generator and/or receiver output may vary substantially, inaasmuch as the amplitude of the ghost signal employed for comparison purposes tends to bear a fixed relationship to the amplitude of the useful component of the $c$ signal. In installations where variations of sensor output amplitude are not considered to be significant, the apparatus illustrated in FIG. 7 can be simplified by eliminating the bandpass filter 71 and the integrator 74 and comparing the integrated $g$ signal from the controllable filter 19 with a fixed reference level signal, or with a reference level that is manually or automatically adjusted. It will be apparent that the amplitude comparator can also be operated on digital principles, as for example by converting the integrated $g$ signal to a binary number which is fed to the control unit 23 for decisions.

It was pointed out above that the value signified by the $w$ signal that is employed in the operation of the controllable filter 19 is generated on the basis of data from a previous sweep stored in the storage means 21. However, when no data obtained from a particular sensor are available in the storage means, the $w$ signal can be adjusted manually by means of an input control denoted by 24. Some experimentation in the adjustment of the control 24 will of course be necessary in most cases, but this can take the form of a slow swing of that control through its range of positions until a readout is obtained at the indicator 22. Until the control is brought to its proper position, the $g$ signal issuing from the controllable filter will of course have zero magnitude or an extremely low magnitude, and consequently the amplitude comparator 25 will prevent the presentation of a distance display. As an alternative to such manual adjustment of the frequency of the $y$ signal that controls the filter 19, its adjustment can be effected by a suitable programming of the control unit.

It will be apparent from what has been said above that the control unit 23 can comprise a properly programmed general purpose computer, or portions thereof, or a hard-wired special purpose computer, and that certain of the other components of the signal processing unit 2, although illustrated as separate from the computer, can nevertheless comprise parts of it.

From the foregoing description taken with the accompanying drawings, it will be apparent that this invention provides a method and apparatus for microwave distance measuring that is particularly well suited for measurement of the level of the surface of a liquid or a solid granular material in a tank or in the hold of a cargo vessel, and which affords accurate measurement results notwithstanding nonlinearity in the sweep frequency and conditions which tend to produce disturbances in the return signal reflected back to the apparatus from the surface of the material.

Those skilled in the art will appreciate that the invention can be embodied in forms other than as herein disclosed for purposes of illustration.

The invention is defined by the folloing claims:

1. A method of measuring distance to a target surface by generating a microwave signal that varies in frequency substantially regularly through a predetermined time period, radiating a first part of said generated signal towards the target surface to produce a return signal reflected from the target surface, and mixing said return signal with a second part of the generated signal to obtain an oscillatory output having a difference frequency which is a function of the distance to be measured, said method being characterized by steps which enable a final output to be obtained that accurately denotes the distance travelled by the return signal notwithstanding any irregularities in said oscillatory output that are due to disturbances in the return signal and lack of perfect regularity in the frequency variation of the generated microwave signal, said steps comprising:
  A. mixing a third part of said generated signal with a fourth part thereof that has been subjected to a predetermined delay to obtain a second oscillatory output having a reference frequency which corresponds to an arbitrary fixed distance;
  B. producing first and second pulsing outputs which correspond respectively to said first mentioned and said second oscillatory outputs and each of which has a pulse rate that is in a predetermined relationship to the frequency of its corresponding oscillatory output;
  C. assigning a numerical factor to each of a number of short and substantially equal time intervals, each beginning upon the production of a pulse of one of said pulsing outputs and which together span a major portion of said time period, the factors assigned to successive time intervals differing stepwise in value from one another;
  D. during each of said time intervals producing two sets of averaging pulses, one set for each of said pulsing outputs, each set consisting of a number of averaging pulses corresponding to the number of pulses of its pulsing output that are produced during the time interval multiplied by the numerical factor assigned to the time interval;
  E. counting the averaging pulses of all of said sets corresponding to each pulsing output that are produced during said major portion of said time period, to obtain a pair of averaging pulse totals; and
  F. producing an output which corresponds to a quotient relationship between said averaging pulse totals and which constitutes said final output.

2. The method of claim 1, wherein the issuance of each pulse of said first pulsing output occurs at the beginning of one of said time intervals, further characterized by:
  1. so producing said first pulsing output that each pulse thereof corresponds to a half-cycle of said first oscillatory output; and
  2. so producing said second pulsing output that the pulse rate thereof is higher than the frequency of said second oscillatory output and substantially higher than the pulse rate of said first pulsing output.

3. The method of claim 2 wherein said second pulsing output is produced by:
  1. multiplying the frequency of said second oscillatory output by a constant value to produce a modified second oscillatory output having a frequency which corresponds to a multiple of said arbitrary fixed distance; and
  2. producing a pulse of said second pulsing output at each half-cycle of said modified oscillatory output.

4. The method of claim 3 wherein the frequency of said second oscillatory output is multiplied by a constant value so selected that the frequency of the modified second oscillatory output is higher than the highest expectable value of the frequency of the first oscillatory output.

5. The method of claim 1 wherein:
said numerical factor that is assigned to each of said time intervals is equal to $n(N - n)$, where
  N is the number of said time intervals in said major portion of said time period, and
  n is the ordinal number of the particular time interval during said time period.

6. The method of claim 1, further characterized by:
  G. before producing said first pulsing output, filtering said first oscillatory output by passing the same through a narrow-band bandpass filter having a controllably variable center frequency; and
  H. so controlling the center frequency of said filter that the same is at all times related to
    a. the approximate distance to be measured and
    b. the frequency of said second oscillatory output.

7. The method of claim 1, further characterized by:
  1. comparing the amplitude of the first oscillatory output with a predetermined reference level, and
  2. discarding oscillatory outputs obtained for any time period during which said amplitude is not above said reference level.

8. A method of measuring distance to a target surface by generating a microwave signal that varies in frequency substantially regularly through a predetermined time period, radiating a first part of said generated signal towards the target surface to produce a return signal reflected from the target surface, and mixing said return signal with a second part of the generated signal to obtain an oscillatory output having a difference frequency which is a function of the distance to be measured, said method being characterized by steps which enable a final output to be obtaned that accurately denotes the distance travelled by the return signal notwithstanding any irregularities in said oscillatory output that are due to disturbances in the return signal and lack of perfect regularity in the frequency variation of the generated microwave signal, said steps comprising:
  A. producing a second oscillatory output having a reference frequency which is substantially higher than that of the first oscillatory output by
    1. mixing a third part of said generated signal with a fourth part thereof that has been subjected to a predetermined delay and
    2. multiplying by a fixed constant value the difference frequency signal obtained as a result of the last mentioned mixing;
  B. producing
    1. a first pulsing output that provides a pulse for every half-cycle of said first oscillatory output, and
    2. a second pulsing output that provides a pulse for every half cycle of said second oscillatory output;
  C. assigning a numerical weighting factor to each of the successive short time intervals that begins with the issuance of each pulse of said first pulsing output during a major portion of said time period, which weighting factor is equal to $n(N-n)$, where N denotes the number of said time intervals in said portion of said time period, and $n$ denotes the ordinal number of the particular time interval in said time period;

D. multiplying each pulse of the first pulsing output issued during said portion of said time period by the value of $n(N-n)$ for the time interval in which such pulse is issued;

E. storing the products of all such multiplications during the time period to obtain a first weighted pulse count;

F. multiplying each pulse of said second pulsing output by the value of $n(N-n)$ for the time interval in which that pulse is issued;

G. storing the products of all of the last mentioned multiplications during said time period to obtain a second weighted pulse count; and H. at the conclusion of said time period producing an output which corresponds to a quotient relationship between said first and second weighted pulse counts and which consitutees said final output.

* * * * *